United States Patent [19]

Lilja et al.

[11] Patent Number: 5,114,070
[45] Date of Patent: May 19, 1992

[54] PNEUMATIC DIRECT DIGITAL CONTROLLER

[75] Inventors: Philip C. Lilja, Minneapolis; Paul W. Ehrlich, St. Paul, both of Minn.; Allenn E. Martin, Baton Rouge, La.

[73] Assignee: American Standard Inc., New York, N.Y.

[21] Appl. No.: 610,497

[22] Filed: Nov. 6, 1990

[51] Int. Cl.⁵ .................................................. G05D 15/00
[52] U.S. Cl. .................................... 236/49.3; 236/51; 236/84
[58] Field of Search ................... 236/49.3, 51, 84; 307/66

[56] References Cited

U.S. PATENT DOCUMENTS

| | | | |
|---|---|---|---|
| 2,764,354 | 9/1956 | Peterson et al. | 236/84 X |
| 2,765,415 | 10/1956 | Ehret | 236/84 U X |
| 3,003,700 | 10/1961 | Joesting | 236/84 X |
| 4,391,913 | 7/1983 | Keldmann | 236/36 |
| 4,433,719 | 2/1984 | Cherry et al. | 165/26 |
| 4,440,066 | 4/1984 | Anderson | 236/84 X |
| 4,500,034 | 2/1985 | Reese et al. | 236/84 X |
| 4,533,080 | 8/1985 | Clark et al. | 236/49 |
| 4,756,474 | 7/1988 | Tulowiecki et al. | 236/49 |
| 4,824,012 | 4/1989 | Tate | 236/49 |
| 4,860,950 | 8/1989 | Reeser et al. | 236/51 |
| 4,890,666 | 1/1990 | Clark | 165/16 |
| 4,942,921 | 7/1990 | Haessig et al. | 236/49.3 X |
| 5,004,149 | 4/1991 | Narikiyo et al. | 236/49.3 |

Primary Examiner—William E. Wayner
Attorney, Agent, or Firm—William J. Beres; William O'Driscoll; Peter D. Ferguson

[57] ABSTRACT

A pneumatic direct digital control system comprising: an air inlet; an air outlet; a transducer for connecting the air inlet and the air outlet and controlling a flow of air therebetween; a power supply; a sensor; and a direct digital controller. The direct digital controller is operably connected to the power supply. Additionally, the controller is operably connected to and is controlling the transducer.

29 Claims, 2 Drawing Sheets

PNEUMATIC DIRECT DIGITAL CONTROLLER

BACKGROUND OF THE INVENTION

The present invention is directed to the replacement of existing pneumatic thermostats for VAV boxes, reheat coils, classroom unit ventilators, fan coil units, fin tube radiators, and the like, with direct digital controllers.

In existing buildings there are thousands of pneumatic thermostats. These pneumatic thermostats are used to operate variable air volume (VAV) boxes, reheat coils, classroom unit ventilators, fan coil units, fin tube radiators, and the like. While the pneumatic thermostats provide many advantages, the pneumatic thermostats are not amenable to monitor and control by a central monitoring system, and do not control as accurately as direct digital controllers. Pneumatic controls also require frequent recalibration and maintenance. Many advantages could be provided by the replacement of the existing pneumatic thermostats with direct digital controllers. However, the "drop in" replacement of pneumatic thermostats with direct digital controllers is not feasible because the control and power supply wiring needed by the direct digital controller are not available in existing buildings.

U.S. Pat. No. 4,533,080 to Clark et al. and a continuation-in-part thereof, U.S. Pat. No. 4,890,666 to Clark, show an air terminal control linked to an air system control by wiring.

U.S. Pat. No. 4,824,012 to Tate shows a motor operated damper which is remotely controlled via a one way link to shut the damper when a signal from a remote transmitter is received by a receiver in a control circuit. The damper controls the airflow for a particular room or office in a group of rooms or offices sharing a single thermostatic control. The control circuit automatically reopens the damper after a delay period.

U.S. Pat. No. 4,433,719 to Cherry et al shows a portable thermostat coupled to the control unit of a heating or cooling device by a one way radio link.

U.S. Pat. No. 4,391,913 to Keldmann shows a feeler gauge for sensing air and radiation temperature and transmitting the same using a wireless transmitter to a regulator.

U.S. Pat. No. 4,860,950 to Reeser et al. shows a portable battery-powered command module, i.e. a thermostat, for remotely adjusting the temperature of a closed environment via a one way link. The module transmits up or down temperature signals to a receiver by means of a modulated radio frequency carrier wave.

SUMMARY OF THE INVENTION

It is an object, feature and advantage of the present invention to provide the replacement of existing pneumatic thermostats with direct digital controllers.

It is an object, feature and advantage of the present invention to provide the "drop in" replacement of a pneumatic thermostat with direct digital controller.

It is an object, feature and advantage of the present invention to provide the "drop in" replacement of pneumatic thermostats with direct digital controls without requiring wiring for an external power source.

It is an object, feature and advantage of the present invention to provide a compact wall mount unit.

It is an object, feature and advantage of the present invention to provide a pneumatic direct digital controller with an internal power source.

It is an object, feature and advantage of the present invention to provide a pneumatic direct digital thermostat which is in wireless communication with a remote master system.

It is an object, feature and advantage of the present invention to provide a pneumatic direct digital thermostat which uses existing pneumatic air piping and pneumatically controlled elements.

It is an object, feature and advantage of the present invention to provide a pneumatic direct digital controller to replace an existing pneumatic thermostat without the addition of new wiring.

The present invention provides a pneumatic direct digital control system comprising: an air inlet; an air outlet; a pneumatic transducer connecting the air inlet and the air outlet; a power supply; a sensor; and a direct digital controller. The controller is operably connected to the power supply. Additionally, the controller is operably connected to and is controlling the transducer.

The present invention provides a pneumatic control system comprising: an air supply inlet; a direct digital controller, a self-contained power supply; a wireless transceiver; a remote master controller; an air outlet; and an electronic-to-pneumatic transducer. The self contained power supply operably connected to the direct digital controller and is providing the direct digital controller with a source of power. The wireless transceiver is operably connected to the direct digital controller and is transmitting and receiving information and commands to a remote master controller. The remote master controller is capable of communicating with the wireless transceiver and capable of transmitting and receiving information and commands. The pneumatic transducer is operably connected to the direct digital controller and is operably connected to both the air supply inlet and the air outlet. The direct digital controller controls the pressure transducer to control the outlet pressure of air leaving the transducer from the air supply inlet to the air outlet.

The present invention also provides a method of controlling a pneumatic device with a direct digital controller comprising the steps of: providing the direct digital controller with a self-contained power source; receiving a signal in the controller indicative of a desired condition; and controlling a pressure transducer in accordance with the signal to vary the air pressure of air provided to the pneumatically controlled device.

The present invention provides a method of replacing a pneumatic thermostat with a direct digital controller comprising the steps of: removing the pneumatic thermostat; installing an electronic-to-pneumatic transducer; installing a self-contained power supply; and installing and operably connecting a direct digital controller to the transducer and the power supply.

The present invention provides a wireless, pneumatic, direct digital controller for a variable air volume system comprising an air inlet; an air outlet; an electronic-to-pneumatic transducer operably connected between the air inlet and the air outlet; wireless means such as a radio receiver for receiving a remote signal; and a direct digital controller operably connected to the wireless means and the transducer whereby the direct digital controller controls the transducer in accordance with the remote signal.

DETAILED DESCRIPTION OF THE INVENTION

Figure 1:
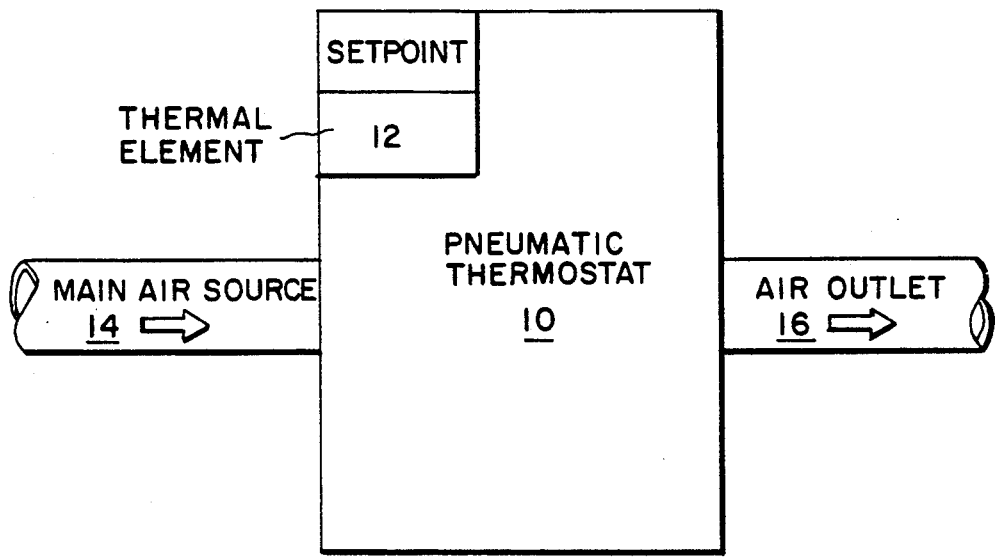
FIG. 1 shows a block diagram of a pneumatic thermostat.

FIG. 1 shows a prior art pneumatic thermostat 10 for use in controlling a pneumatic device such as a VAV box, a reheat coil, a classroom unit ventilator, a fan coil unit, or a fin tube radiator. Typically the pneumatic thermostat 10 is located in a wall near the entrance of a space to be conditioned. The pneumatic thermostat 10 includes a thermal element 12, a main air source inlet tube 14, and an air outlet pipe 16. The main air source inlet tube 14 typically provides a 15 or 20 PSI source of low volume compressed air. The thermal element 12 senses the temperature of an area to be controlled, and provides a signal to the pneumatic thermostat 10 which is proportional to the sensed temperature. The pneumatic thermostat 10 uses a series of pins and bellows (not shown) to provide a pneumatic signal out of the air outlet pipe 16 which is proportional to the thermostat temperature signal. The prior art pneumatic thermostat 10 is a self contained unit which does not include any wiring for either power supply or control lines.

Figure 2:
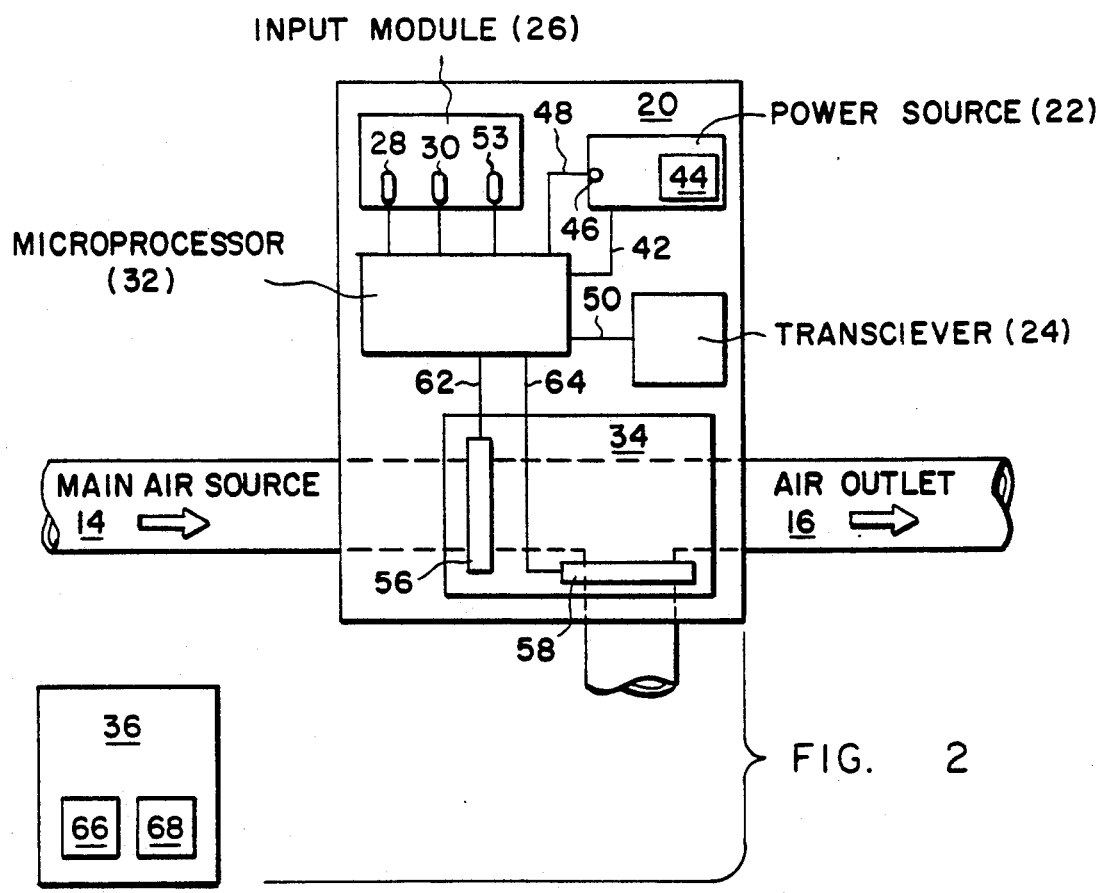
FIG. 2 shows a block diagram of the present invention.

FIG. 2 shows a preferred embodiment of the present invention where the pneumatic thermostat 10 shown in FIG. 1 has been replaced by a direct digital controller 20 which includes a thermostatic control algorithm. The direct digital controller 20 includes a self-contained power source 22, a wireless transceiver 24; an input module 26 including a temperature sensitive element 28 and a setpoint device 30; a microprocessor 32; and an electronic-to-pneumatic transducer 34 located between the main air source inlet tube 14 and the air outlet pipe 16. FIG. 2 also shows a remote master controller 36.

The power supply 22 shown in FIG. 2 is a self-contained internal power supply, preferably a battery 44 which supplies power to the microprocessor 32 by an electrical line 42. The microprocessor 32 includes a current sensor 46 connected to the power source 22 by an electrical line 48 to monitor power usage. The microprocessor 32 adjusts its functions based on the available energy from the power source 22.

Figure 3:
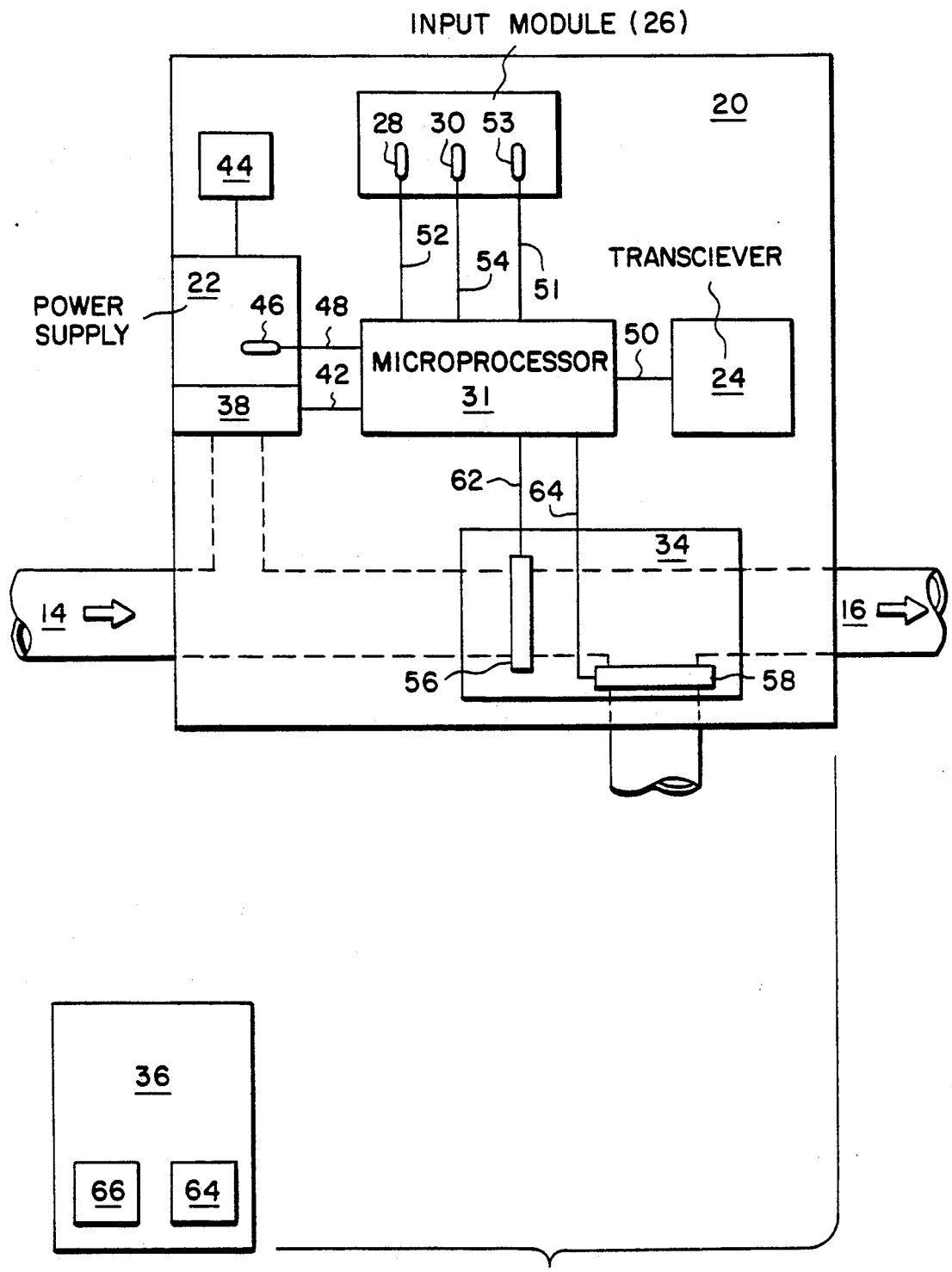
FIG. 3 shows a block diagram of an alternative embodiment of the present invention.

An alternate power supply 22 is shown in FIG. 3 which uses a small air turbine generator 38 connected to the main air source 14 by a supply air tube 40 which bleeds to atmosphere. The supply air tube 40 provides a small volume of air, up to 25 cubic inches per minute, to the air turbine generator 38 to produce power. The power is supplied to the controller by the electrical line 42. In this embodiment a battery 44 or a capacitative electrical storage device may be used as a backup source of power or to even out fluctuations in the power demand. Alternatively, a piezoelectric generator or a solar cell (not shown) may be used as a primary or supplemental power supply.

In the preferred embodiment the wireless transceiver 24 is a spread spectrum radio based device for providing RF communication with the remote master controller 36 and is connected to the microprocessor by an electrical connector 50. However, other wireless transmission schemes are also contemplated including single radio frequency, ultrasonic, infrared or light transmission. Additionally, the transceiver could be replaced by a transmitter, a receiver or the combination of a radio receiver and a radio transmitter The transceiver 24 transmits space temperature information, requests for override tenant selected, setpoint information, and other more specialized information. The transceiver 24 receives space setpoint information, mode of operation information, setpoint offset information, output override commands and information, as well as control action commands from the remote master controller 36. The transceiver 24 sends the information received from the remote master controller 36 to the microprocessor 32 by means of the electrical connection 50. The electrical connection also supplies the transceiver 24 with power.

The microprocessor 32 also receives inputs on an electrical line 52 from the input module 26 and the temperature sensitive element 28 providing a reading of the temperature in the zone to be controlled, on an electrical line 54 from the setpoint device 30 providing a desired space setpoint and on an electrical line 51 indicating that a timed over ride button 53 has been pushed by an operator. Alternatively, a wireless setpoint or space temperature device could be provided. The microprocessor 32 runs a direct digital control algorithm which uses time, the setpoint, and the space temperature as inputs, and produces an output to the pneumatic transducer 34 indicating the pressure of air which should be present in the air outlet 16. The microprocessor 32 also determines the appropriate mode of operation, for instance heating, cooling, night, day or manual control, and modifies the direct digital control algorithm as appropriate. Additionally, the microprocessor 32 monitors the sensor 46 and uses the resultant information to manage the power needs of the direct digital controller 20. The microprocessor 32 also stores setpoints and control algorithms in a memory device or suitable substitute preferably using non-volatile local memory. Finally the microprocessor 32 also coordinates remote communications with the remote master controller 36.

The electronic-to-pneumatic transducer 34 is a low air volume electro-pneumatic device that varies the pneumatic output pressure based on the control signals received from the microprocessor 32. In the preferred embodiment the pneumatic transducer 34 uses a pair of miniature electric solenoid valves 56, 58 which are powered by the battery 44. A supply air solenoid 56 controls the passage of air from the main air source tube 14 to the air outlet pipe 16 and is used to add low volume supply air pressure to the air outlet pipe 16 from the main air source inlet tube 14 and thereby increases the pressure in the air outlet pipe 16. A bleeder solenoid 58 controls the passage of air from the air outlet pipe 16 to atmosphere 60 and is used to bleed a low volume of air from the air outlet pipe 16 and thereby reduce its pressure. The microprocessor 32 is connected to the supply air solenoid 56 and the bleeder air solenoid 58 by electrical connections 62 and 64 respectively. The microprocessor 32 pulses the two solenoids 56, 58 as needed to increase or decrease the air pressure in the air outlet pipe 16. A small reservoir of air (not shown) can be provided to aid in regulating the air pressure. However, other pneumatic transducing methods can be used.

The remote master control 36 includes a transceiver 66 for communication with several wireless pneumatic direct digital thermostats. The remote master controller 36 functions to allow operation of the wireless pneumatic direct digital controllers 20 in a stand alone mode or to integrate the operation of a number of pneumatic direct digital controllers 20 with a building automation system. The remote master controller 36 also includes a microprocessor device 68 which uses spread spectrum radio communications in the preferred embodiment to interface with the pneumatic direct digital thermostats. The remote master controller 36 is powered by line voltage and is typically mounted in a central location.

The remote master controller 36 transmits information to the pneumatic thermostats 20 on an individual, group, or global basis. The information transmitted includes space setpoint information, mode of operation information, control action commands, setpoint offset information, and output override information and commands. Additionally the remote master controller 36 also receives the following information from each pneumatic direct digital controller 20 space temperature information, requests for override, tenant setpoint information, and other information.

What has been described is a pneumatic direct digital controller 20 which can replace an existing pneumatic thermostat without the addition of external wiring or an external power supply. The pneumatic direct digital controller 20 receives signals, from a sensor and/or a remote controller indicative of a system condition, and uses an electronic-to-pressure transducer to control the pressure in an air outlet in accordance with the signal received. In the preferred embodiment the direct digital controller 20 is a unitary drop in replacement for a pneumatic thermostat. Under some circumstances it may be desirable to locate the input module 26 removely from the direct digital controller 20. For instance, if the existing pneumatic thermostat were inconveniently located, the input module 26 could be relocated to a more convenient location and connected to the drop in replacement direct digital controller 20 by conventional means.

It should be recognized that modifications and alterations of the present invention as described herein are possible. Various internal power supplies may be provided as well as various wireless transmission schemes. Additionally, the electronic-to-pneumatic transducer may be implemented in various ways. All such modifications and alterations are intended and contemplated to be within the spirit and scope of the present invention.

What is desired to be secured by Letters Patent of the United States is claimed as follows:

1. A pneumatic direct digital controller comprising:
    an air inlet;
    an air outlet;
    transducer means for connecting said air inlet and said air outlet and for controlling the pressure of air between the air inlet and the air outlet;
    a self-contained internal power supply;
    a sensor;
    wireless means for receiving and transmitting remote signals; and
    a direct digital controller operably connected to the power supply, operably connected to and controlling the transducer means, operably connected to the wireless means, and operably connected to the sensor to receive a signal from the sensor;
    whereby the pressure of air in the air outlet is controlled in accordance with the signal received from the sensor.

2. The controller of claim 1 wherein the receiving and transmitting means transmits and receives radio signals.

3. The controller of claim 2 wherein the radio signals are spread spectrum signals.

4. The controller of claim 3 wherein the receiving and transmitting means transmits and receives infrared signals.

5. The controller of claim 3 wherein the receiving and transmitting means transmits and receives ultrasonic signals.

6. The controller of claim 1 wherein the power supply includes an air generator or a piezoelectric generator operably connected to the air inlet.

7. The controller of claim 1 wherein the power supply includes wireless means for receiving remote signals or wireless means for transmitting remote signals.

8. The controller of claim 1 wherein the power supply includes a battery.

9. The controller of claim 1 wherein the power supply includes a source of solar power.

10. The controller of claim 1 wherein the pneumatic transducer includes a pair of solenoids for controlling the amount of air passed from the air inlet to the air outlet.

11. The controller of claim 10 wherein the pair of solenoids are miniature electric solenoid valves.

12. The controller of claim 11 wherein said pair of solenoids includes a first solenoid controlling the passage of air between said air inlet and said air outlet, and a second solenoid controlling the passage of air between said air outlet and atmosphere.

13. A pneumatic control system comprising:
    an air supply inlet;
    a direct digital controller;
    a self-contained power supply operably connected to the direct digital controller and providing the direct digital controller with a source of power;
    wireless means, operably connected to the direct digital controller, for transmitting and receiving information and commands to a remote master controller;
    a remote master controller capable of communicating with the wireless means and capable of transmitting and receiving information and commands;
    an air outlet; and
    an electronic-to-pneumatic transducer operably connected to the direct digital controller and operably connected to said air supply inlet and said air outlet whereby the direct digital controller controls the pressure transducer to control the pressure of air passing through the transducer from the air supply inlet to the air outlet.

14. The control system of claim 13 wherein the direct digital controller controls the pneumatic transducer based in part on the commands and information received from the master controller through the wireless means.

15. The pneumatic control system of claim 13 wherein the pressure transducer includes a first solenoid controlling the passage of air between the air supply inlet and the air outlet, and a second solenoid controlling the passage of air between the air outlet and atmosphere.

16. The pneumatic control system of claim 15 wherein the power supply includes an air generator operably connected to the air supply inlet.

17. The pneumatic control system of claim 15 wherein the power supply includes a piezoelectric generator operably connected to the air supply inlet 18. The pneumatic control system of claim 15 wherein the power supply includes a battery.

19. The pneumatic control system of claim 15 wherein the power supply includes a source of solar power.

20. The pneumatic control system of claim 13 wherein the wireless means includes a radio transceiver; a radio receiver; a radio transmitter; or a radio transmitter and a radio receiver.

21. The pneumatic control system of claim 13 wherein the wireless means transmits and receives infrared signals.

22. The pneumatic control system of claim 13 wherein the wireless means transmits and receives ultrasonic signals.

23. A method of controlling a pneumatic device with a direct digital controller comprising the steps of:
providing the direct digital controller with a self-contained power source;
receiving, in the controller, a signal from a sensor indicative of a desired condition;
receiving, in the controller, a wireless signal from a remote master controller; and
controlling a pressure transducer in accordance with the signals received from the remote master controller and the sensor to vary the air pressure of air provided to the pneumatically controlled device.

24. The method of claim 23 wherein the providing step includes generating power from a pneumatic air supply.

25. The method of claim 23 wherein the providing step includes generating power from light.

26. The method of claim 23 including receiving the signal from a wireless remote sensor.

27. The method of claim 23 wherein the controlling step includes using a proportional integral control algorithm to meet space temperature control requirements.

28. A wireless, pneumatic, direct digital controller for a variable air volume system comprising:
an air inlet;
an air outlet;
an electronic-to-pneumatic transducer operably connected between the air inlet and the air outlet;
wireless means for receiving a remote signal;
a direct digital controller operably connected to said wireless means and said transducer whereby the direct digital controller controls the transducer in accordance with the remote signal;
a sensor operably connected to the controller;
transmitting means, operably connected to the controller, for transmitting a wireless signal indicative of a signal received from the sensor; and
a self-contained power supply operably connected to the controller.

29. A method of replacing a pneumatic thermostat with a direct digital controller comprising the steps of: removing the pneumatic thermostat; installing an electronic-to-pneumatic transducers; installing a self-contained power supply; installing and operably connecting a direct digital controller to the transducer and the power supply, installing a wireless transceiver or receiver; and operably connecting said transceiver or receiver to said direct digital controller.

* * * * *